United States Patent [19]

Ishida

[11] Patent Number: 4,464,039

[45] Date of Patent: Aug. 7, 1984

[54] CHARGE COMPLETION DETECTING DEVICE FOR FLASH PHOTOGRAPHY SYSTEM

[75] Inventor: Tokuji Ishida, Daito, Japan

[73] Assignee: Minolta Camera Kabushiki Kaisha, Osaka, Japan

[21] Appl. No.: 471,055

[22] Filed: Mar. 1, 1983

[30] Foreign Application Priority Data

Mar. 3, 1982 [JP] Japan .................................. 57-34312

[51] Int. Cl.³ .......................... G03B 7/00; G03B 15/03
[52] U.S. Cl. .................................. 354/418; 354/127.11
[58] Field of Search ............... 354/418, 127.11, 127.12

[56] References Cited

U.S. PATENT DOCUMENTS

3,953,864  4/1976  Iwata et al. .......................... 354/418
4,196,988  4/1980  Kawasaki ............................ 354/418
4,225,218  9/1980  Numata ................................ 354/418

Primary Examiner—Russell E. Adams
Attorney, Agent, or Firm—Watson, Cole, Grindle & Watson

[57] ABSTRACT

An electric signal of a level which corresponds to a required amount of flash light based on flash exposure conditions e.g. film sensitivity, aperture value and object distance data in a camera is fed to an electronic flash device. A charge completion detecting device in the electronic flash device compares this level of the electric signal from the camera with a charging level of a main capacitor, and outputs a charge completion signal when the charging level reaches a given level corresponding to the level of the electric signal from the camera. By this charge completion signal, flash firing and flash photography is enabled.

10 Claims, 3 Drawing Figures

CHARGE COMPLETION DETECTING DEVICE FOR FLASH PHOTOGRAPHY SYSTEM

BACKGROUND OF THE INVENTION

1. Field of the Invention

The present invention relates to a charge completion detecting device which outputs a charge completion signal when a main capacitor for energizing a flash tube is charged to a given level, and especially to such a charge completion detecting device for a flash photography system wherein signals are exchanged between a camera circuit and an electronic flash device circuit for their mutual control.

2. Description of the Prior Art

Recently, a flash photography system has been proposed wherein the amount of flash light emitted from an electronic flash device to an object to be photographed is controlled in accordance with a signal fed from a camera. A camera of such a system obtains a distance signal representing the distance from the camera to the object by means of the adjusted position of the focus adjusting ring provided on a lens barrel. Another camera obtains the distance signal from an automatic focus detecting device provided in the camera. Those cameras calculate a datum of the appropriate or required amount of flash light, from the object distance signal obtained as explained above, along with data of the manually set film sensitivity and a manually preset or object light dependently automatically determined diaphragm aperture value. The cameras then feeds the datum of the required flash light amount to an electronic flash device, which compares the datum from the camera with a signal corresponding to the amount of flash light measured directly from a flash tube and integrated, and controls the amount of flash light emitted from the flash tube in accordance with the comparison.

In another flash photography system, the exposure control mode of a camera is automatically switched from a day light photography mode to a flash light photography mode in response to a charge completion signal fed from an electronic flash device when the main capacitor of the device is charged to a given level. With the mode switching, the shutter speed to be controlled is changed over from a proper value determined in accordance with a light measurement to a flash synchronizable value suitable for flash photography.

In such flash photography systems, the voltage level which the main capacitor is to attain for the charge completion is fixed to a value, e.g. to 300 V corresponding to a substantially fully charged condition for presenting the maximum amount of flash light. In other words, the time interval from the start of charging to its completion is always constant in so far as the initial voltage of the main capacitor is the same. The charging state of the main capacitor is treated as uncompleted until the charged voltage reaches the given full voltage, although in photographic conditions where the object is close to the camera or the diaphragm aperture is opened widely, the electronic flash device can emit a sufficient amount of light to the object even if the main capacitor has not been fully charged. If shutter release operation is made under such uncompleted conditions, a proper flash photography with a proper amount of flash light in accordance with the signal from the camera is not effected, e.g. the electronic flash device is not fired or the camera exposure control mode is not changed to the flash light photography mode, and a photographic opportunity may be lost.

An independent electronic flash device has been proposed which can change the reference voltage for the detection of charge completion in accordance with the manual operation for adjusting the amount of flash light to be emitted from the electronic flash device. But this reference voltage changing operation is made independently of the photographic conditions of the camera, so that the prior art device requires manual changing or adjusting operation for both the flash device and the camera resulting in inconvenience and complexity of handling.

SUMMARY OF THE INVENTION

Accordingly, it is an object of the present invention to provide a flash photography system for automatically obtaining a sufficient quantity of flash light in accordance with flash photography conditions determined in a camera.

It is another object of the present invention to provide a flash photography system wherein a charge completion detecting device detects the charged level of a main capacitor or an electronic flash device with reference to a level variable in accordance with the flash photography conditions produced from a camera.

It is a further object of the present invention to provide a flash photography system wherein a flash firing is disabled when the required quantity of flash light based on flash photography conditions determined in a camera is not within the range of quantity of flash light controllable in the electronic flash device.

According to the present invention, a charge completion detecting device detects the charged voltage of the main capacitor of an electronic flash device with reference to the level of an electric signal produced in a camera such that the level of the signal corresponds to an amount of flash light determined in accordance with flash photography conditions such as a camera-to-object distance, a film sensitivity and diaphragm aperture. In other words, the charge completion detecting level changes according to the flash photography conditions in the camera. Consequently, when the main capacitor is charged to a level determined by the signal from the camera, flash firing and flash light photography are enabled. Accordingly, the user should not always wait for the attainment of a fixed maximum charged level, e.g. 300 V by the main capacitor. Accordingly, a complex manual operation for adjusting the flash photography conditions, is dispensed with, because the reference level for the detection of the charge completion is automatically changed by the signal from the camera. Moreover, as the time interval from the start of charging to the charge completion changes in accordance with the required quantity of flash light, preparation for flash photography can be made faster when the required amount of flash light is slight, whereby the possibility of a photographic opportunity being lost will be reduced.

According to an embodiment of the present invention, a discriminating device discriminates whether or not the required quantity of flash light is within a range of a flash light quantity controllable by the electronic flash device. This discriminating device interrupts the change completion signal when the required amount is not within the controllable range. Accordingly flash light photography is made only when sufficient flash emission is available, and it can prevent improper exposure.

According to a further embodiment of the present invention, the charge completion detecting device is employed in an electric flash device which can emit a preliminary flash light for determining flash exposure conditions in advance of the main flash emission for a film exposure, and the preliminary flash and main flash is emitted by the discharge of a single main capacitor through a single flash tube.

It is still another object of the present invention to provide a charge completion detecting device which can emit the same amount of main flash light regardless of whether preliminary flash is emitted or not.

To this end, it is selected in the camera by manual operation whether the preliminary flash is required or not, and selecting a signal of a "High" or "Low" level representing the necessity of preliminary flash is transmitted to the electronic flash device. In the electronic flash device, two different charge completion detecting levels of the main capacitor are provided corresponding to the necessity and unnecessity of the preliminary flash such that the same quantity of main flash light is always obtained. A charge completion detecting device selectively selects either one of the charge completion detecting levels according to the selection signal from the camera, compares the selected level with the charged level of the main capacitor, and outputs a charge completion detecting signal when the latter reaches the former level. Accordingly, charge completion detecting level changes in accordance with the selection signal representing the necessity or unnecessity of preliminary flash, and the same amount of main flash emission is available.

BRIEF DESCRIPTION OF THE DRAWINGS

Many other features, advantages and additional objects of the present invention will become manifest to those skilled in the art upon making reference to the detailed description which follows and the accompanying sheet of drawings.

DETAILED DESCRIPTION OF THE PREFERRED EMBODIMENTS

Figure 1:
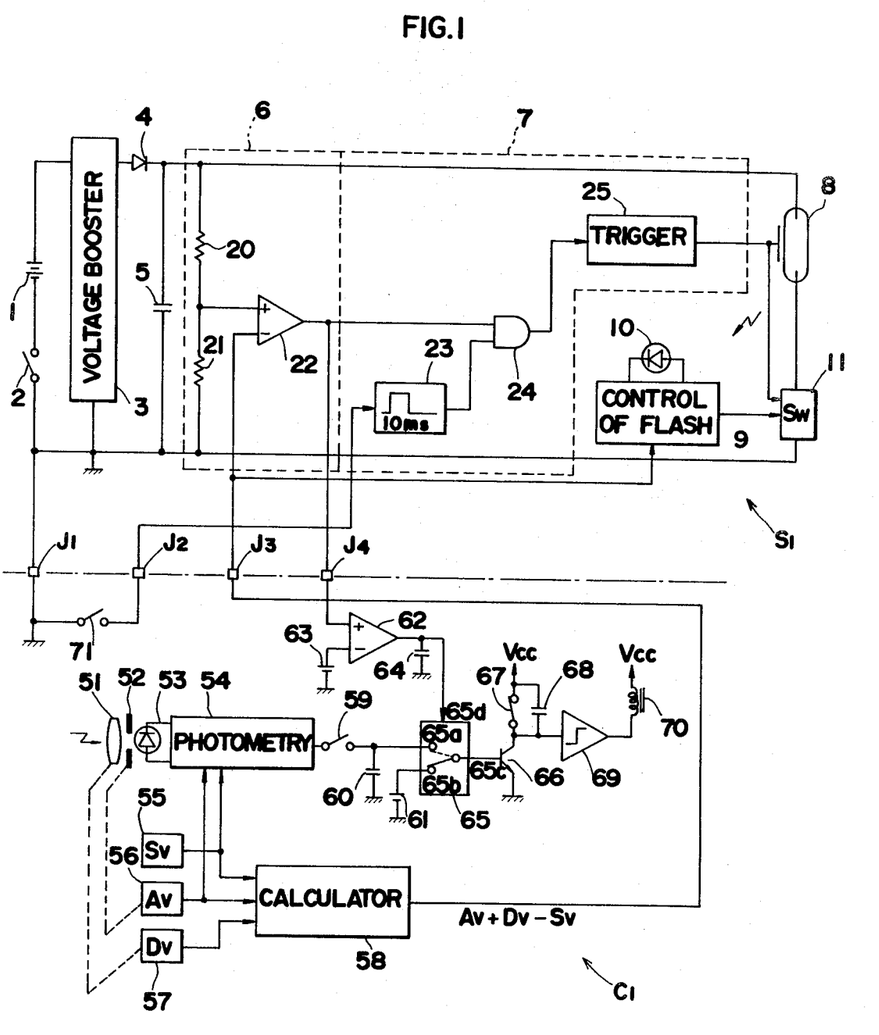
FIG. 1 is a circuit diagram of the first embodiment of the present invention.

FIG. 1 is a block diagram of a charge completion detecting device of the photographic system according to the present invention. In the Figure, the portion above a chain line shows a circuit of an electronic flash device S1 while the portion below the chain line shows a circuit of camera C1. The two circuits are connected to each other through terminal J1 through J4 to exchange their signals. Camera C1 is a single lens reflex camera provided with a focal plane shutter and a storage type automatic exposure control circuit. Camera C1 includes a photography mode switching circuit which switches the photography mode of the camera in response to a charge completion signal supplied through connection terminal J4, and a signal output circuit which supplies through connection terminal J3 to an electronic flash device, an emitted light determining signal of a given voltage for determining the amount of light emitted from electronic flash device S1. The circuit of electronic flash device S1 includes charge completion detecting circuit 6 which is supplied with the emitted light determining signal of the given voltage level as its reference voltage and which supplies a charge completion signal through connection terminal J4 to camera C1 when a voltage corresponding to the charged voltage of main capacitor 5 reaches the reference voltage, trigger circuit 25 for initiating flash firing in response to the signal of the logical multiple of the charge completion signal and a flash firing instruction signal supplied through connection terminal J2, light emitting member 8 is a flash tube, and emitted light amount control circuit 9 for controlling the amount of the emitted light in accordance with the level of the emitted light determining signal.

In the circuit of camera C1, photoelectric element 53 is disposed on or close to the pentagonal prism of the camera viewfinder to receive light from an object to be photographed, through camera objective lens 51, the aperture of diaphragm 52 and a reflex mirror (not shown), and generates a photoelectric current representative of the brightness of the object to be photographed. Light measuring circuit 54 receives, as its input signals, the photoelectric current and signals representative of a set film sensitivity and an aperture value, and generates a light measurement voltage signal Tv1 representative of the APEX value of an exposure time suitable for the measured brightness, the film sensitivity and the diaphragm aperture value. The light measurement voltage signal is applied through normally open switch 59 to storage capacitor 60 and further to one input terminal of mode selection circuit 65 as the photography mode switching circuit. Normally open switch 59 serves as a storage switch and is adapted to be opened immediately before the reflex mirror is swung upwards in advance of a film exposure. Normally open switch 59 is closed after the termination of the film exposure.

Mode selection circuit 65 is applied at its another input terminal 65b with voltage Tv2 which is fed from constant voltage source 61 and which is representative of the APEX value of a flash synchronizable exposure time, e.g. 1/60 second. To control terminal 65d is applied a control signal with a level varying in dependence on whether the charging of main capacitor 5 (described below) has been completed or not. Mode selection circuit 65 alternatively selects either one of voltages Tv1 and Tv2 in accordance with the level of the control signal. Mode selection circuit 65 normally selects and outputs, as shown by broken line, voltage Tv1 which is applied to input terminal 65a. When a "High" level signal representative of a charge completion is applied to control terminal 65C, mode selection circuit 65 is switched to the state as shown by the solid line to output voltage TV2 applied to input terminal 65b. The circuit block composed of comparator 62, constant voltage source 63 and capacitor 64 is provided for generating the control signal. Comparator 62 has its non-inverting input terminal connected with connection terminal J4, its inverting input terminal connected with constant voltage source 63 and its output terminal connected to capacitor 64 and control terminal 65d of mode selection circuit 65. Comparator 62 functions to convert a charge completion signal (described later) of a "High" level fed from electronic flash device S1, into a "High" level signal conformable to the power source voltage Vcc of camera C1. Capacitor 64 has a given capacitance of the value sufficient for delaying the transmission of the change of the output level of comparator 62 for a desired time, e.g. the flash synchronizable time at the least.

Logarithmic expansion transistor 66, normally closed switch 67, integrating capacitor 68, switching circuit 69 and electromagnet 70 together form an exposure time control circuit which is well-known per se. Transistor 66 produces a collector current proportional to the antilogarithm of its base voltage, i.e. voltage Tv1 or Tv2 applied from output terminal 65c of mode selection circuit 65. The collector of transistor 66 is connected with integrating capacitor 68 across which normally closed switch 67 is connected. Capacitor 68 is connected with the input terminal of switching circuit 69 which in turn has its output terminal connected with electromagnet 70 for restraining the trailing curtain of the camera focal plane shutter. When switch 67 is opened in synchronization with the start of the travelling of the preceding shutter curtain, capacitor 68 starts the integration of the collector current of transistor 66. At the same time, electromagnet 70 is energized to restrain the trailing shutter curtain. After a lapse of a suitable exposure time determined by the signal from the light measuring circuit or a flash synchronizable exposure time determined by constant voltage source 61, the integration by capacitor 68 reaches a given level whereupon the output of switching circuit 69 is inverted to de-energize electromagnet 70 and release the trailing shutter curtain thereby terminating the exposure. Normally open switch 71 serves as a synchro switch and is adapted to be closed upon full opening of the shutter. The signal of the closure of switch 71 is utlized as the flash firing instruction signal and is applied to connection terminal J2.

Film sensitivity datum outputing circuit 55, diaphragm aperture value datum outputing circuit 56, camera-to-object distance datum outputing circuit 57, and calculation circuit 58 together form a data signal outputting section. Film sensitivity datum outputting circuit 55 generates voltage Sv representative of the APEX value of a manually set film sensitivity and the voltage is applied to light measuring circuit 54 and calculation circuit 58. Diaphragm aperture value datum outputting circuit 56 generates voltage Av representative of the APEX value of manually preset diaphragm aperture value and the voltage is applied to light measuring circuit 54 and calculation circuit 58. Camera-to-object distance datum outputting circuit 57 applies to calculation circuit 58 voltage Dv representative of the APEX value of a camera-to-object distance which may be detected, for example, by detecting the position of the focusing ring of the objective lens. Calculation circuit 58 performs an exposure calculation with (or basing on) the voltages fed from the aforementioned circuits 55, 56 and 57 to generate a voltage of the level as the result of the calculation of $Av+Dv-Sv$, i.e. the voltage representative of the value of the amount of the flash light to be emitted from the electronic flash device for providing a proper exposure, the value being measured by units determined in the same manner as the APEX values are determined. The output voltage of calculation circuit 58 is applied, as the emitted flash light amount instruction signal, to connection terminal J3.

In the circuit of electronic flash device S1, voltage booster circuit 3 is composed, for example, of a DC-DC converter. Upon closure of power switch 2, voltage booster circuit 3 converts the low DC voltage of power source 1 into pulses of a high voltage which charges main capacitor 5 through diode 4 to a high voltage. Charge completion detecting circuit 6 is composed of voltage dividing resistors 20 and 21 for dividing the voltage of the charged voltage of main capacitor 5 and comparator 22 which has its non-inverting input terminal connected between resistors 20 and 21, its inverting input terminal connected with connection terminal J3 and its output terminal connected with connection terminal J4. The ratio of the resistance values of resistors 20 and 21 is selected to be, for example, 200:1 such that the fraction of the fully charged voltage e.g. 300 V corresponding to the maximum amount of light to be emitted from the electronic flash device, is less than the power source voltage of camera C1, e.g. 3 V. Comparator 22 inverts its output from a "Low" to a "High" level when the fraction of the charged voltage of main capacitor 5 reaches the voltage applied through connection terminal J3 as the result of the calculation of $Av+Dv-Sv$. The "High" level signal from comparator 22 is supplied, as a charge completion signal, to connection terminal J4 and to one input terminal of AND gate 24 which will be described later.

In the trigger section 7, one-shot circuit or monostable multivibrator circuit 23 has its input terminal connected with connection terminal J2 and generates a "High" level flash trigger instruction signal for a period, e.g. 10 millisecond, for covering the maximum duration of the flash firing when connection terminal J2 is connected to the ground terminal J1 and is grounded. The output terminal of one-shot circuit 23 is connected with the other input terminal of AND gate 24 which serves as a gate for the flash trigger instruction signal. AND gate 24 is unblocked to transmit the flash trigger instruction signal to a well-known flash tube trigger circuit 25 only when the charge completion signal is being generated. Upon receipt of the flash trigger instruction signal, trigger circuit 25 applies a high voltage pulse to the trigger electrode of flash tube 8 and at the same time applies a conduction signal to switching element 11 which is serially connected with flash tube 8, thereby initiating the flash light emission of flash tube 8. Switching element 11 is blocked by emitted light amount control circuit 9 which is described below. Emitted light amount control circuit 9 has its input terminals connected across photocell element 10 for monitoring the intensity of the emitted flash light, and its control terminal connected with connection terminal J3. When the logarithmic compression value of the integration of the light received by photocell element 10 reaches the voltage as the result of the calculation of $Av+Dv-Sv$, control circuit 9 blocks switching element 11. Photocell element 10 is located in the vicinity of flash tube 8 to directly receive the flash light from the flash tube, and a phtocell with a low sensitivity (e.g. a commercially available light emitting diode connected in opposite direction) may be used for the element 10.

The operation of the embodiment of the above described construction will now be explained briefly. Let's assume that, in camera C1, light measuring circuit 54 generates voltage Tv1 as a function of the APEX values of an object brightness, a preset diaphragm aperture value and a set film sensitivity, i.e. the voltage representative of a proper exposure time for daylight or natural light photography. The voltage Tv1 is charged through storage switch 59 to capacitor 60. Calculation circuit 58 generates a voltage of Av+Dv−Sv wherein Sv, Av and Dv are respectively the voltages representative of APEX values of a set film sensitivity, a present diaphragm aperture value and a camera-to-object distance. In other words, the voltage Av+Dv−Sv corresponds to the APEX like value of the amount of flash light for providing a proper exposure for a flash photograph with only the flash light contributing to the exposure, the amount of flash light being determined in dependence on the camera-to-object distance, i.e. in accordance with the same principle as flashmatic diaphragm aperture determination. The resultant voltage of the calculation of Av+Dv−Sv is applied through connection terminal J3 to the inverting input terminal of comparator 22 and emitted light amount control circuit 9 in electronic flash device S1.

In the case when power switch 2 of electronic flash device S1 is open, the voltage level at connection terminal J4 is "Low" and comparator 62 of camera C1 also generates a "Low" level signal. Accordingly, mode selection circuit 65 receives at its control input terminal a "Low" level signal and selects the natural light photography mode as shown by the broken line. If a camera release operation is made under that condition, storage switch 59 is opened immediately before the lifting or swing-up of the reflex mirror so that the above mentioned light measurement voltage Tv1 is stored in capacitor 60. Then, in conjunction with the start of the travel of the preceding shutter curtain, switch 67 is opened to initiate a well-known exposure control. After a lapse of a time period corresponding to the stored voltage Tv1, the trailing shutter curtain is released to start traveling and terminate the exposure in the natural light photography mode.

When power switch 2 of electronic flash device S1 is closed, voltage booster circuit 3 starts its operation to charge main capacitor 5 to a high voltage. When the fraction of the charged voltage of main capacitor 5 reaches the voltage applied from camera C1 and corresponding to the APEX like value of a proper flash light amount, comparator 22 inverts its output to a "High" level which is supplied through connection terminal J4 to camera C1 as a charge completion signal. In response to the "High" level signal, comparator 62 in camera C1 invert its output to a "High" level to switch mode selection circuit 65 to the state as shown by the solid line. With the switching, mode selection circuit 65 selects voltage Tv2 determined by constant voltage source 61 in compliance with the flash synchronizable exposure time to switch camera C1 to the flash photography mode. The "High" level signal from comparator 22 is also fed to AND gate 24 in trigger block 7 to enable the gate and enable the flash firing by trigger circuit 25 in response to the flash trigger instruction signal from one-shot circuit 23.

Then, a shutter release operation is effected on camera C1 to initiate a camera exposure cycle. Upon completion of the travel of the preceding shutter curtain, switch 71 is closed to shortcircuit connecting terminals J1 and J2 to ground. In response to that grounding, one-shot circuit 23 generates a flash firing instruction signal, which is applied through AND gate 24 to well-known trigger circuit 25 to initiate the firing of flash tube 8. Emitted light amount control circuit 9 directly monitors, by means of photocell element 10, the amount of light emitted from flash tube 8 and blocks switching element 11 to stop the firing when the logarithmically compressed value of the integration of the output of photocell element 10 reaches the voltage applied to the control input terminal of control circuit 9 as the signal commensurate with the APEX like value of the required amount of emitted light. Meanwhile, it may occur that due to the flash firing, the charged voltage of main capacitor 5 drops to invert the output of comparator 22 to a "Low" level. However, as the output signal of comparator 62 is delayed for that period by capacitor 64 and is prevented from inverting during the period of the flash synchronizable time, mode selection circuit 65 remains in the state of being connected to terminal 65b so that the exposure time is controlled to the flash synchronizable time in accordance with voltage Tv2.

If the next flash photograph is made with the preset diaphragm aperture value and/or the camera-to-object distance being charged, calculation circuit 58 generates an output voltage that determines the flash light amount to be emitted but which has a different value. As charge completion detecting circuit 6 of electronic flash device S1 generates a charge completion signal in accordance with the voltage applied thereto through connection terminal J3, the charged voltage of main capacitor 5 at the time of a charge completion signal being generated changes with the change of the values of exposure parameters such as the film sensitivity, the preset diaphragm aperture value and/or the camera-to-object distance. Accordingly, the charging time of main capacitor 5, i.e. from the closure of power switch 2, or from a flash firing to the completion of preparation for the next flash firing, varies in accordance with the photographic conditions. Thus, in comparison with the conventional electronic flash device wherein the charging time for the main capacitor is always constant, the above embodiment has an advantage that it can provide a short-time preparation for the next flash photograph for an object lying close to the camera, thereby reducing the loss of photographic opportunities.

Figure 2:
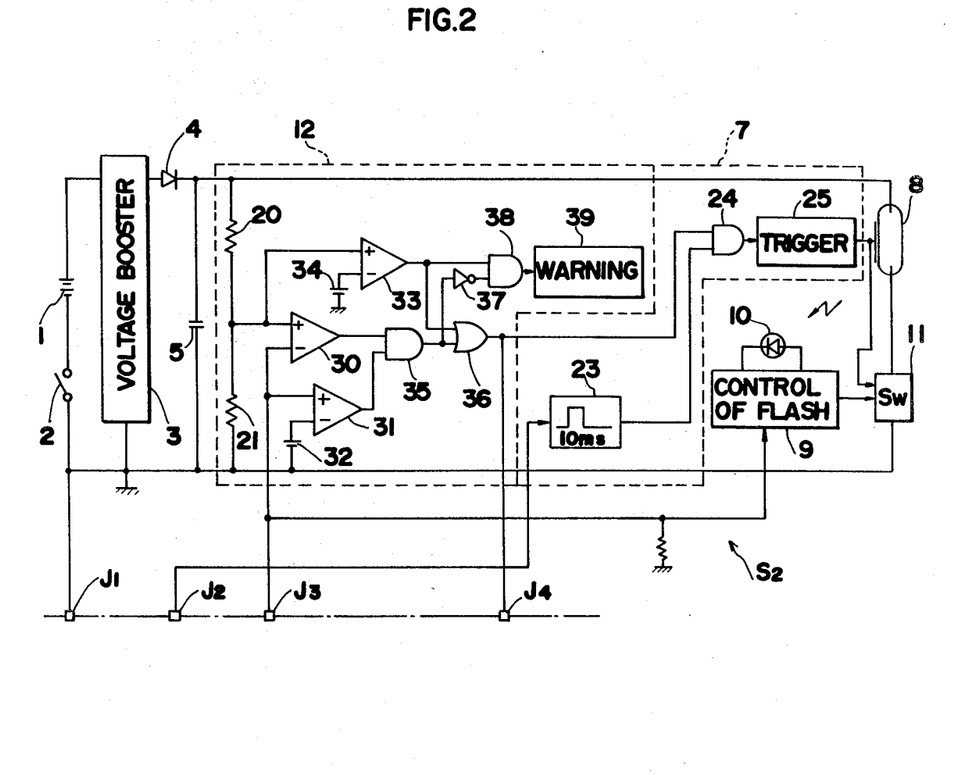
FIG. 2 is a circuit diagram of another embodiment of the present invention, wherein only the modified flash circuit is shown.

FIG. 2 is a circuit diagram showing the second embodiment of the charge completion detecting circuit according to the present invention. In the Figure the same or like elements as those of FIG. 1 are denoted by the same reference characters and their detailed description is therefore omitted. Further, the camera to be connected with electronic flash device S2 of the second embodiment may be the same as camera C1 employed in the first embodiment and is omitted in FIG. 2. According to the second embodiment, charge completion detecting circuit 12 is constructed to cope with the case where the light amount instructed from camera C1 to be emitted from the flash device is beyond the maximum amount of light that the flash can emit, and the case where the electronic flash device according to the present invention is coupled with a camera with no connection terminal as the terminal J3 in FIG. 1, i.e. with no function of outputting the emitted light amount instruction signal.

In charge completion detecting circuit 12 shown in FIG. 2, the node between voltage divider resistors 20 and 21 is connected to the non-inverting input terminals of comparators 30 and 33. Connection terminal J3 is connected with the inverting input terminal of comparator 30 and non-inverting input terminal of comparator 31. Constant voltage sources 32 and 34 are respectively connected with inverting input terminals of comparators 31 and 33, and generate respective voltages corresponding to the minimum and maximum amount of the flash light that electronic flash S2 can be controlled to emit. Thus, comparator 31 functions to determine whether the light amount instructed from camera C1 as to be emitted is within or beyond the controllable minimum light amount of flash device S2. Comparator 30 functions to determine whether the light amount to be emitted in accordance with the charged voltage of main capacitor 5 has or has not reached the light amount instructed from camera C1. Comparator 33 functions to determine whether the light amount to be emitted in accordance with the charged voltage of main capacitor 5 has or has not reached the maximum amount of flash light that the flash device can emit.

Both output terminals of comparator 30 and 31 are connected with the input terminal of AND gate 35, and both output terminals of comparator 33 and AND gate 35 are connected with the input terminal of OR gate 36. OR gate 36 functions to output the charge completion signal and has its output connected with connection terminal J4 and one input terminal of AND gate 24.

Further, AND gate 38 receives, as its input signal, directly the output of comparator 33 and the output of AND gate 35 through inverter 37. The output of AND gate 38 is connected with warning circuit 39 which comprises an acoustic element such as a buzzer and an oscillator circuit for driving the acoustic element and which is operable only when the charge completion signal is output from comparator 33 to thereby provide a warning of abnormal charge completion state.

The following explanation concerns the operation of the embodiment in the case where electronic flash device S2 is coupled with camera C1 shown in FIG. 1. When the amount of flash light instructed from camera C1 through connection terminal J3 to be emitted is within the light amount available with electronic flash device S2, comparator 31 automatically outputs a "High" level. When the fraction of the charged voltage of main capacitor 5 reaches the voltage commensurate with the instructed flash light amount in the same way as the first embodiment, the output of comparator 30 is inverted to a "High" level. Accordingly, AND gate 35 generates a "High" level output which is output through OR gate 36 as a normal charge completion signal.

In contrast thereto, when the flash light amount instructed from camera C1 is out of the range of the light amount that electronic flash 8 can be controlled to emit, the output of AND gate 35 can not be a "High" level and no normal charge completion signal is generated. When the light amount instructed from camera C1 is below the minimum amount of light available with electronic flash device S2, the output of comparator 31 is a "Low" level. When the light amount instructed from camera C1 exceeds the maximum amount of light available with electronic flash device S2, the output of comparator 30 remains at a "Low" level. Under this condition, when the fraction of the charged voltage of main capacitor 5 reaches the voltage corresponding to the maximum available amount of light, the output of comparator 33 is inverted to a "High" level and a charge completion signal is generated through OR gate 36. Although the charge completion signal can not provide the emitted light control to the instructed amount, the signal indicates that electronic flash device S2 has attained the condition wherein it can emit the maximum amount of light. At the same time, AND gate 38 generates a "High" level output to actuate warning circuit 39 to warn with the acoustic indication the unusual charge completion state.

The following explanation concerns the operation of the embodiment in the case where electronic flash device S2 is coupled with a camera (not shown) which has connection terminals J1, J2 and J4 but lacks terminal J3, i.e. lacks the function of generating the output for instructing the amount of light to be emitted. In this case, connection terminal J3 of electronic flash device assumes a "Low" input level, the output of AND gate 35 always remains at a "Low" level likely as in the case when the instructed light amount is below the minimum available amount. Accordingly, when main capacitor 5 is charged to the voltage commensurate with the maximum available light amount, a charge completion signal is output through comparator 33 and OR gate 36, and at the same time, warning circuit 39 is actuated to indicate by an acoustic signal that the main capacitor in electronic flash device S2 has been charged to the voltage corresponding to the maximum available light amount.

In the above embodiments described with reference to FIGS. 1 and 2, the level for the detection of charge completion in the electronic flash device is changed in proportion to the voltage applied from the camera as, for example, the instructed flash light amount. However, the present invention is not limited to such a manner of charge completion detection, but may be designed such that the reference level for the charge completion detection is changed stepwise in accordance with the two level signals "High" or "Low", or with a signal which can assume one of more than two levels, with the level being applied from the camera. For example, an electronic flash device has been proposed which can emit a preliminary flash light for projecting light onto an object to be photographed, in advance of the light emission for photography. If such an electronic flash device is constructed such that whether the preliminary light emission is made or not is selectable and that a common main capacitor is discharged for both the preliminary flash light emission and the flash light emission for photography, the reference level for the detection of charge completion should be changed in accordance with the selection of making or not making the preliminary flash light emission, in order to ensure a fixed desired amount of light being projected on an object to be photographed whether the preliminary flash light is emitted or not. In other words, when the preliminary flash light is to be emitted with the flash light emission for photography, the reference level for the detection of charge completion should be increased by an amount used for the preliminary flash light emission in comparison with the case when the flash light is emitted only for the photograph. An embodiment to cope with such a case is described with reference to FIG. 3.

Figure 3:
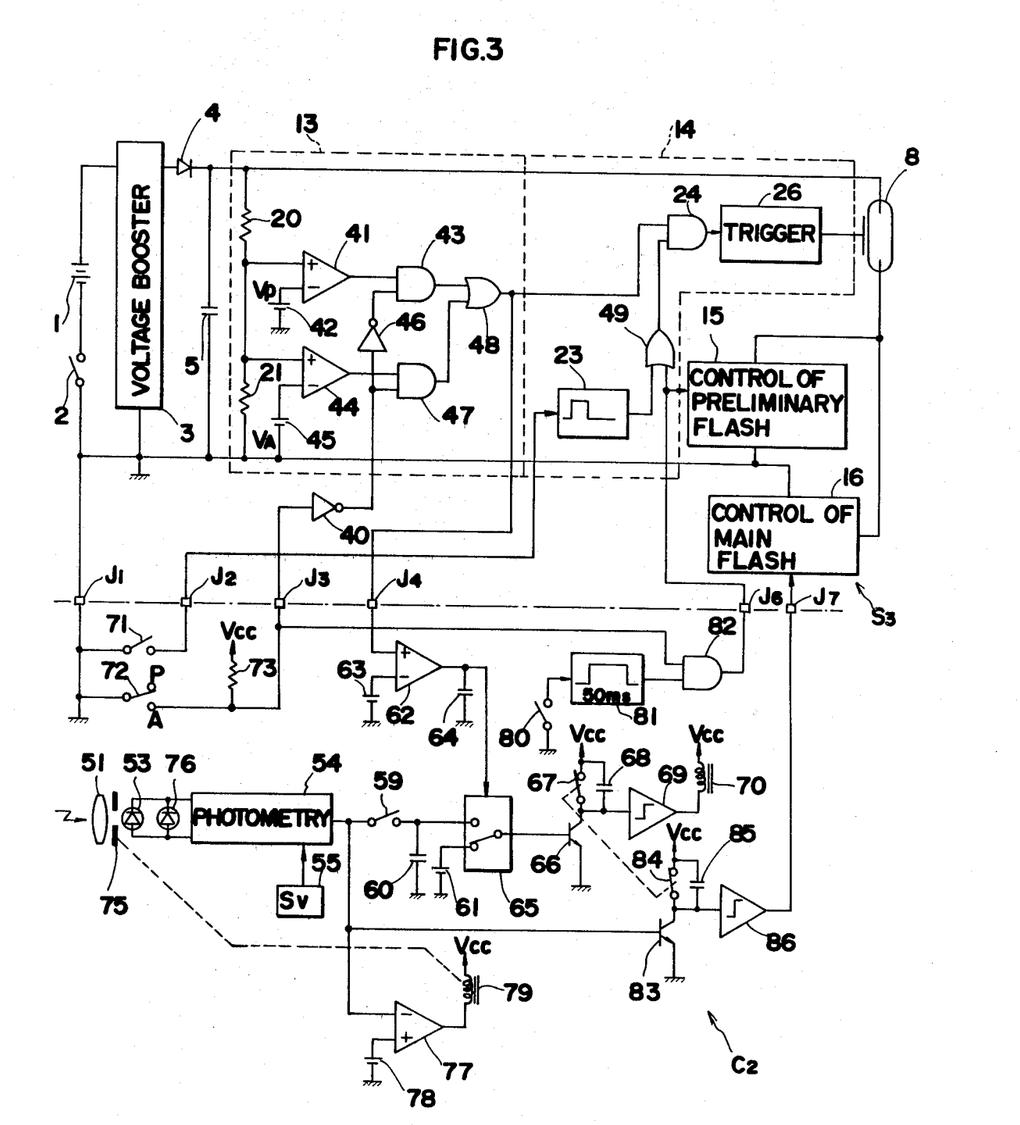
FIG. 3 is a circuit diagram of the third embodiment of the present invention for preliminary flash type light emission.

FIG. 3 is a circuit diagram showing schematically a camera circuit and an electronic flash circuit of the flash photography system wherein the preliminary flash light emission may be selectively effected. In the Figure, the portion below a chain line shows the circuit of camera C2 while the portion above the chain line shows the circuit of electronic flash device S3. Both circuits exchange signals through six connection terminals J1, J2 and J4 through J7. Of the connection terminals, terminal J5 corresponds to terminal J3 in FIG. 1 and transmits, from camera to electronic flash device (S3), a signal selectively assuming two values of a "High" and a "Low" level in accordance with the later-to-be described selection of the flash photography mode. A preliminary light emission instructing signal for determining the duration of the preliminary light emission is supplied through connection terminal J6 from camera C2 to electronic flash device S3. Photographing flash light stop signal described later is also supplied from camera C2 to electronic flash device S3 through connection terminal J7. It should be noted that like or the same elements as those of FIG. 1 are designated by the same reference characters and their detailed explanation is omitted.

At first the construction and operation of the circuit of camera C2 will be explained. The camera C2 has two other functioning circuit arrangements in addition to the construction of camera C1 of FIG. 1. One of them is the arrangement for selective diaphragm control for flash photography wherein the diaphragm aperture is controlled to a preset diaphragm aperture value (A mode) and is automatically controlled in accordance with the measurement of the light from a photographic object (i.e. an object to be photographed) illuminated by a preliminary flash light (P mode). The other is the circuit arrangement for interrupting the flash light emission for photography when a given value is attained by the integrated value of the amount of the light coming from the object illuminated by the photographic flash light, the object light passing through the camera objective lens and the diaphragm aperture, reflected by the film plane being exposed and measured.

Switch 72 is connected with its one terminal to the ground and with its other terminal to connection terminal J5 and to the positive terminal of the power source via resistor 73 and is operated in conjunction with the selecting operation of a flash photography mode selecting member (not shown) to be closed for the selection of the A mode and opened for the selection of P mode. Normally open switch 80 is connected with its one end to the ground terminal and with its other end to the input terminal of one-shot circuit 81. Switch 80 is closed immediately before diaphragm 51 of objective lens 51 starts to be stopped-down by a diaphragm drive member (not shown) which starts its operation in response to a shutter release operation. One-shot circuit 81 is connected with its output to the other input terminal of AND gate 82 and is adapted to generate a "High" level output preliminary light emission instructing signal for a given time, e.g. 50 milliseconds, in response to the closure of switch 80. It should be understood that the given time of the preliminary light emission instructing signal covers the period during which diaphragm 75 is stopped down by the diaphragm driving member to its minimum aperture size. The output terminal of AND gate 82 is connected to connection terminal J6. AND gate 82 serves as a gate to be unblocked and blocked in accordance with the selection of the above mentioned flash photography modes to supply the preliminary light emission instructing signal through connecting terminal J6 to electronic flash device S3 only when the P mode has been selected by the opening of switch 72.

Photoelectric element 76 is disposed at the bottom of the mirror box of camera C2 to receive the light which is reflected from a photographic object being illuminated by the photographic flash light and which passes through objective lens 51 and the aperture of diaphragm 75 and is reflected by the film plane. Photoelectric elements 53 and 76 are connected parallelly with each other and between input terminals of light measuring circuit 54. Photoelectric element 53 generates a photoelectric current commensurate with the intensity of the light reflected from the photographic object (object light) when the reflex mirror is at the view position to reflect the object light to the camera veiwfinder optical system. Photoelectric element 76 generates a photoelectric current commensurate with the intensity of the object light when the reflex mirror is at the photographic position retired out of the photographic light path. The output of light measuring circuit 54 is applied through switch 59 to storage capacitor 60 and is also fed to the inverting input terminal of comparator 77 in the diaphragm control section as well as to the base of transistor 83 of the signal outputting section which outputs a signal for instructing the stop of the flash light emission for photography. The diaphragm control section comprises comparator 77, constant voltage source 78 connected to the non-inverting input terminal of comparator 77, and electromagnet 79 connected to the output of comparator 77 to be energized in synchronization with the commencement of the operation of the diaphragm driving member. Electromagnet 79 functions to stop the stopping down operation of diaphragm 75. Comparator 77 de-energizes electro-magnet 79 to stop the stopping down operation when the light measurement output of light measuring circuit 54, which decreases with the stopping down of diaphragm 75, becomes lower than the level given by constant voltage source 78. The photographic flash stopping signal outputting section comprises transistor 83, normally closed switch 84 adapted to be opened in linked relationship with the opening of switch 67, integrating capacitor 85 and switching circuit 86. The input terminal of switching circuit 86 is connected with capacitor 85 which in turn is connected with the collector of transistor 83. Switch 84 is connected across capacitor 85. The output of switching circuit 86 is connected to connection terminal J7. In synchronization with the commencement of film exposure, i.e. shutter opening, switch 84 is opened to initiate the integration of the light measurement output by capacitor 85. When the integration represented by the charged voltage of capacitor 85 reaches a given level, switching circuit 86 generates a "High" level signal as the photography flash light stop signal which is supplied through connection terminal J7 to electronic flash device S3.

Electronic flash device S3 includes a single main capacitor 5 for storing the electric energy for the preliminary and photography flash light emissions, charge completion detecting circuit 13 for detecting the charged voltage of the main capacitor, trigger circuit 14 for triggering flash tube 8 for the preliminary and photography light emissions and preliminary and photography light control circuits 15 and 16 serially connected with flash tube 8 for controlling respectively the amounts of the flash light for the preliminary light emission and the photography light emission.

In charge completion circuit 13, the node between voltage divider resistors 20 and 21 is connected with the respective non-inverting input terminals of comparators 41 and 44. Constant voltage sources 42 and 45 are respectively connected with the inverting input terminals of comparators 41 and 44, and have voltages corresponding to the required amount of flash light for the P mode and A mode operation of camera C2. The voltages Vp and VA of constant voltage sources 42 and 45 are determined such that the amount of the flash light to be emitted upon photography is the same regardless of the selected mode. In other words, the voltage Vp is higher than the voltage VA by an amount corresponding to the amount of the flash light for the preliminary light emission. The voltage Vp corresponds, for example, to the maximum amount of light to be emitted from the electronic flash device. The output terminals of comparators 41 and 44 are respectively connected with one of the input terminals of AND gate 43 and 47. Inverter 40 is connected with its input terminal to the connection terminal J5 and with its output terminal directly with the other input terminal of AND gate 47. The output terminal of inverter 40 is also connected through inverter 46 to the other input terminal of AND gate 43. OR gate 48 receiving as its inputs the output signals of AND gate 43 and 47 is provided for outputting a charge completion signal and is connected with its output terminal to connection terminal J4 and to one input terminal of AND gate 24.

In trigger circuit 14, OR gate 49 is interposed between the output terminal of one-shot circuit 23 and the other input terminal of AND gate 24. OR gate 49 is connected with its one input terminal to the output terminal of one-shot circuit 23 and with its other input terminal to connection terminal J6 and to the input terminal of preliminary light amount control circuit 15. OR gate 49 transmits the photography light emission instructing signal from one-shot circuit 23 and the preliminary light emission instructing signal from connection terminal J6, to trigger circuit 26 through AND gate 24.

Preliminary light amount control circuit 15 may have a construction as disclosed in U.S. Pat. No. 4,275,335, including a light receiving element (not shown) for directly monitoring the flash light emitted from flash tube 8 and controlling the energization of the latter such that flash tube 8 emits preliminary light of a constant intensity for the period required for the preliminary light emission. Photography flash light control circuit 16 is connected with its input terminal to connection terminal J7 and is adapted to stop the photography flash light emission in response to a photography flash light stop signal fed from camera C2.

When the P mode is selected by the operation of a flash photography mode selecting member (not shown), switch 72 is opened in response thereto and electronic flash device S3 is applied with a "High" level signal through connection terminal J5. The "High" level signal is also applied to AND gate 82 to enable it. The "High" level is further inverted by inverter 40 to a "Low" level to disable AND gate 47. The inverted "Low" level is again inverted by inverter 46 to enable AND gate 43. Thus, charge completion detecting circuit 13 generates a "High" level charge completion signal through comparator 41, AND gate 43 and OR gate 48 when the fraction of the charged voltage of main capacitor 5 reaches voltage Vp of constant voltage source 42. The charge completion signal is applied to AND gate 24 of trigger circuit 14 to enable the gate and is also fed through connection terminal J4 to camera C2 to change over the selection circuit 65 to the flash photography mode selecting state as shown by the solid line.

Switch 80 is closed in synchronization with or immediately before the beginning of the stopping down operation of diaphragm 75 of objective lens 51 by the actuation of the diaphragm driving member in response to a shutter release operation. Upon closure of switch 80, one-shot circuit 81 outputs a "High" level preliminary light emission instruction signal for 50 milliseconds. As AND gate 82 has been enabled, the instruction signal is applied through connection terminal J6 to trigger circuit 14 and to preliminary light control circuit 15 so that electronic flash tube 8 is triggered to emit flash light for the preliminary light emission with preliminary light control circuit 15 operating to maintain the emitted flash light constant. The preliminary light emission of constant intensity is maintained for 50 milliseconds to illuminate the photographic object with the light so that light measuring circuit 54 generates a light measurement output in response to the light reflected from the object. At this time, diaphragm 75 is being stopped down with the light measurement signal of light measuring circuit 54 due to the output of photoelectric element 53 at the pentagonal prism decreasing with the reduction of the diaphragm aperture. When the light measurement output reaches the level defined by constant voltage source 78, comparator 77 inverts its output to a "High" level to deenergize electromagnet 79 and stop the operation of the diaphragm driving member so that the diaphragm 75 is automatically controlled to an aperture in accordance with the light measurement output which bears the information of the camera-to-object distance obtained from the measurement of the light reflected from the photographic object being illuminated by the preliminary flash light.

After the lapse of 50 milliseconds mentioned above, the reflex mirror swings up and subsequently the preceding shutter curtain starts to travel. In synchronization with that starting movement, both switches 67 and 84 are opened to initiate the integration of capacitors 68 and 85 for the photographic light, the exposure time control and emission control. At this time transistor 66 receives at its base the voltage Tv2 of constant voltage source 61 corresponding to the flash synchronizable exposure time, while transistor 83 receives at its base the light measurement output commensurate with the intensity of the object light reflected by the preceding shutter curtain and/or the surface of the film. When switch 71 is closed in conjunction with the termination of the travel of the preceding shutter curtain, one-shot circuit 23 generates a pulse signal for the instruction of the photography flash light emission to start the flash firing for the photography as in the case of the former embodiments. Capacitor 85 integrates the light measurement signal commensurate with the intensity of the light reflected from the photographic object being illuminated by the photography flash light. When the charged voltage at the capacitor 85 reaches a given value, the output of switching circuit 86 inverts to a "High" level which is supplied as a photography flash-light stop siganl, through connection terminal J7 to photography flash light control circuit 16 to terminate the flash firing.

In this case when the A mode is selected, switch 72 is manually closed so that a "Low" level signal is applied through connection terminal J5 to electronic flash device S3. Accordingly, in contrast to the former case, AND gate 43 is disabled and AND gate 47 is enabled. Thus, when the fraction of the charged voltage of main capacitor 5 reaches the voltage VA of constant voltage source 45, charge completion detecting circuit 13 outputs a "High" level charge completion signal through comparator 44, AND gate 47 and OR gate 48.

In this case, as AND gate 47 has been disabled by the closure of switch 72, the preliminary light emission instructing signal from one-shot circuit 81 is not applied to the electronic flash device. At a result, with the exceptions that only the photography flash light emission is effected and that the diaphragm aperture is definitely determined to a preset value, the embodiment operates in the A mode in substantially the same manner as in the P mode described above. Thus explanation of the subsequent operation in the A mode is not necessary. In the above embodiment, two comparators 41 and 44 respectively detect the charge completion with different reference voltage irrespectively of the selected mode of flash photography and either of the outputs of the comparators is selected in accordance with the selected mode. The embodiment may be modified such that either one of constant voltages 42 and 45 is at first selected in accordance with the selected mode and the voltage of the selected constant voltage source is compared by a single comparator with the voltage corresponding to the charged voltage of the main capacitor.

According to the above embodiment, the reference level for the detection of charge completion in a charge completion detecting circuit of an electronic flash device capable of the preliminary flash light emission, is changed in accordance with whether the preliminary light is to be emitted or not, to make constant the amount of flash light emitted for photography or film exposure, whereby flash photography can be made with a proper amount of exposure whether the preliminary flash light is emitted or not.

As many apparently widely different embodiments of this invention may be made without departing from the spirit and scope thereof, it is to be understood that the invention is not limited to the specific embodiments thereof except as defined in the appended claims.

What is claimed is:

1. A flash photography system, comprising:
   a flash tube for illuminating an object to be photographed;
   a flash amount instructing means for generating an instruction signal representative of an amount of flash light required for flash photography;
   a main capacitor for energizing the flash tube;
   a charged signal generating means for generating a charge related signal corresponding to a charged voltage of said main capacitor; and
   a comparator means for comparing said instruction signal and said charge signal and generating a charge completion signal when the two signals reach a predetermined relationship with respect to one another.

2. A flash photography system according to claim 1, having a day light photography mode and a flash light photography mode, further comprising a photography mode switching means for automatically switching the photography mode from day light photography mode to flash light photography mode in response to said charge completion signal fed from said comparator means.

3. A flash photography system according to claim 1 wherein said flash light amount instructing means includes a distance datum means for outputting a camera-to-object distance datum, a film sensitivity datum means for outputting a manually set film sensitivity datum, and a diaphragm aperture datum means for outputting a diaphragm aperture value datum representing a diaphragm aperture value which is manually preset or determined dependent on the object light, and a calculating means for calculating the level of said instruction signal from said distance datum, said film sensitivity datum and said diaphragm aperture value datum.

4. A flash photography system including a camera and an electronic flash device and wherein signals are exchanged between a camera circuit and an electronic flash circuit for their mutual control, said camera comprising:
   a flash light amount instructing means for generating an instruction signal wherein the level of the instruction signal selectively changes stepwise to one of more than two levels corresponding to flash photography conditions of the camera;
   a first terminal for transmitting said instruction signal from said flash light amount instructing means; and
   said electronic flash device comprising:
   a second terminal for receiving said instruction signal transmitted from said first terminal of said camera;
   a reference level signal generating means, having more than two reference flash light amount levels corresponding to said levels of said flash light amount instructing means, for generating selectively one reference level;
   a main capacitor for energizing a flash tube;
   a charged level signal generating means for generating a charged level signal representing a flash light amount corresponding to a charged voltage of said main capacitor; and
   a comparator means for comparing said reference level and said charged level and generating a charge completion when the two levels reach a given relationship with respect to one another.

5. A flash photography system according to claim 4 wherein said electronic flash device is capable of emitting a preliminary flash light to the object to be photographed in advance of the film exposure, and said flash light amount instructing means including a flash light photography mode selecting means for manually selecting whether the preliminary flash light is emitted or not, thereby generating said instruction signal of "High" or "Low" level corresponding to the selection, said main capacitor energizing said flash tube for either preliminary flash light emission and photography flash light emission or only the photography flash light emission, and said reference level generating means has two reference levels of different value corresponding to the preliminary and photography flash light emission so that the former level is higher than the latter by an amount corresponding to the amount of preliminary flash light emission.

6. An electronic flash device having a charge completion detecting device comprising:
   a battery source;
   a flash tube for illuminating an object to be photographed;
   a voltage booster for boosting the battery source voltage;
   a main capacitor for charging the output from said voltage booster and energizing the flash tube;
   a first terminal for receiving a flash firing instruction signal fed from a camera;
   a trigger means for firing the flash tube in response to said flash firing instruction signal from said first terminal;
   a charged level signal outputting means for outputting a charged level representing a flash light amount corresponding to a charged voltage of said main capacitor;
   a second terminal for receiving a flash light amount instructing signal fed from said camera, determined on the flash light photography conditions; and
   a comparator means for comparing said charged level and the level of said flash light amount instruction signal and generating a charge completion signal when the two levels reach a given relationship with respect to one another.

7. An electronic flash device according to claim 6 wherein said trigger means is enabled in accordance with said charge completion signal from said comparator.

8. An electronic flash device according to claim 6 further comprising a third terminal for transmitting said charge completion signal as a photography mode switching signal to said camera, whereby the photography mode in the camera is automatically switched from a day light photography mode to a flash light photography mode.

9. An electronic flash device according to claim 6 wherein said comparator means includes a first comparator for comparing said charged level and instruction level and generating a first charge completion signal when the two levels reach a given relationship with respect to one another, a minimum flash light amount outputting means for outputting a minimum level of flash light amount that said electronic flash device can control to emit, a second comparator means for comparing said minimum level and said instruction level, and a first gate means for enabling passage of said first charge completion signal when said second comparator distinguishes that said instruction level is above said minimum level.

10. An electronic flash device according to claim 6 wherein said comparator means includes a first comparator means for comparing said charged level and said instruction level and generating a first charge completion signal when the two levels reach a given relationship with respect to one another, a maximum flash light amount outputting means for outputting a maximum level of flash light amount that said electronic flash device can control to emit, a third comparator means for comparing said maximum level and said instruction level, and a first gate means for enabling passage of said second charge completion signal when said third comparator distinguishes that said instruction level is above said maximum level, and said device further comprising a warning means for warning of irregular charge completion in response to a generation of said second charge completion signal fed from said first gate means.

* * * * *